United States Patent
Yu et al.

(10) Patent No.: US 9,421,819 B2
(45) Date of Patent: Aug. 23, 2016

(54) VEHICLE WHEEL HUBCAP WITH VENT

(71) Applicant: CONSOLIDATED METCO, INC., Vancouver, WA (US)

(72) Inventors: Xin Yu, Vancouver, WA (US); Mark Robert Brasch, Vancouver, WA (US)

(73) Assignee: Consolidated Metco, Inc., Vancouver, WA (US)

( * ) Notice: Subject to any disclaimer, the term of this patent is extended or adjusted under 35 U.S.C. 154(b) by 107 days.

(21) Appl. No.: 14/551,750

(22) Filed: Nov. 24, 2014

(65) Prior Publication Data
US 2016/0144659 A1    May 26, 2016

(51) Int. Cl.
*B60B 7/00*    (2006.01)

(52) U.S. Cl.
CPC ......... *B60B 7/002* (2013.01); *B60B 2900/5118* (2013.01); *B60B 2900/561* (2013.01)

(58) Field of Classification Search
CPC .......... B60B 7/002; B60B 7/0013; B60B 7/04
USPC ........... 301/108.1, 108.2, 108.3, 108.4, 108.5
See application file for complete search history.

(56) References Cited

U.S. PATENT DOCUMENTS

| | | | | |
|---|---|---|---|---|
| 4,834,464 A * | 5/1989 | Frehse | ...................... | B60B 7/00 184/6.25 |
| 5,021,918 A * | 6/1991 | Maki | ...................... | B60B 7/002 152/152.1 |
| 5,291,130 A * | 3/1994 | Kendzior | ................ | B60B 7/002 188/181 R |
| 5,482,358 A * | 1/1996 | Kuck | ...................... | B60B 7/002 301/108.1 |
| 5,785,390 A * | 7/1998 | Gold | ........................ | B60B 7/00 301/108.1 |
| 5,860,708 A * | 1/1999 | Borders | .................. | B60B 7/002 301/108.1 |
| 6,783,191 B1 * | 8/2004 | Slesinski | ................ | B60B 7/002 301/108.1 |
| 7,156,890 B1 * | 1/2007 | Thompson | ......... | B01D 46/0005 301/108.1 |
| 9,290,044 B2 * | 3/2016 | Leung | ..................... | B60B 7/002 |
| 9,308,776 B2 * | 4/2016 | Templin | ............. | B60B 27/0047 |

* cited by examiner

*Primary Examiner* — Kip T Kotter
(74) *Attorney, Agent, or Firm* — Edward J. Brosius

(57) ABSTRACT

A heavy duty vehicle hubcap assembly is provided. The hubcap assembly includes a main section with flanges and flange holes for mounting to a wheel hub. The main section of the hubcap assembly also includes an opening to receive a plug assembly. The plug assembly is comprised of a main section, usually comprised of rubber, and a baffle section, usually comprised of a plastic material. The main section includes a restrictive opening to allow equalization of air pressure between the inside seal portion of the hub cap assembly and the atmosphere.

3 Claims, 5 Drawing Sheets

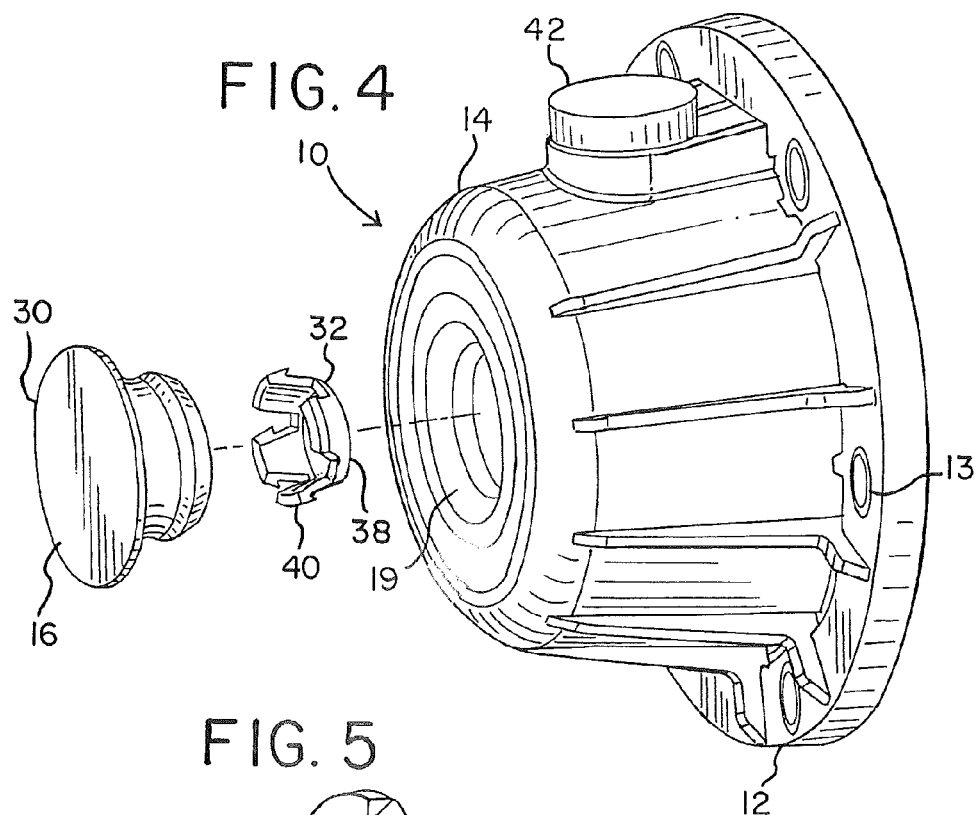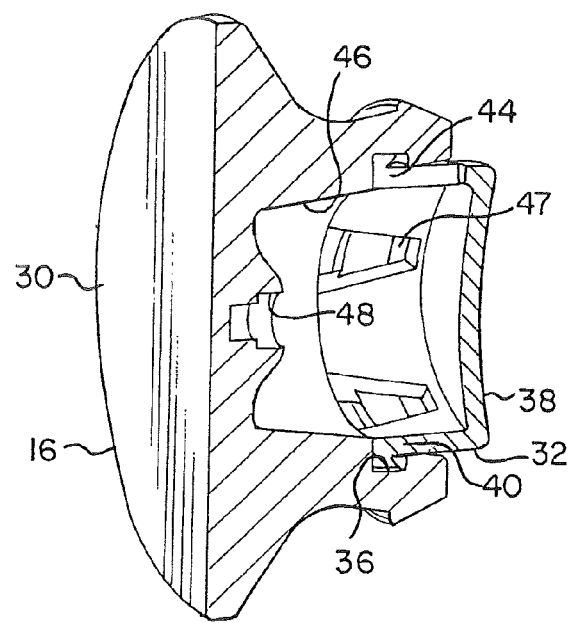

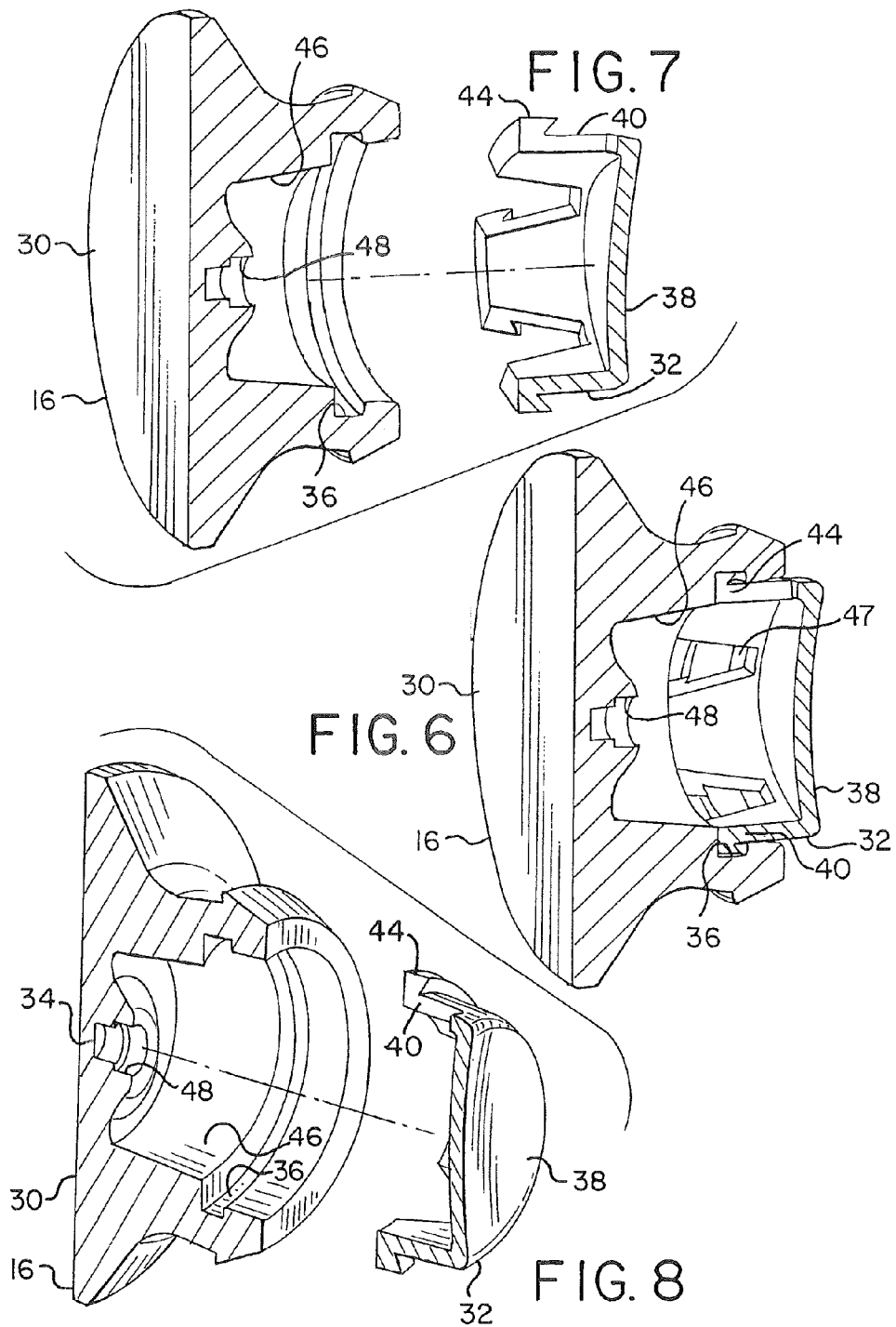

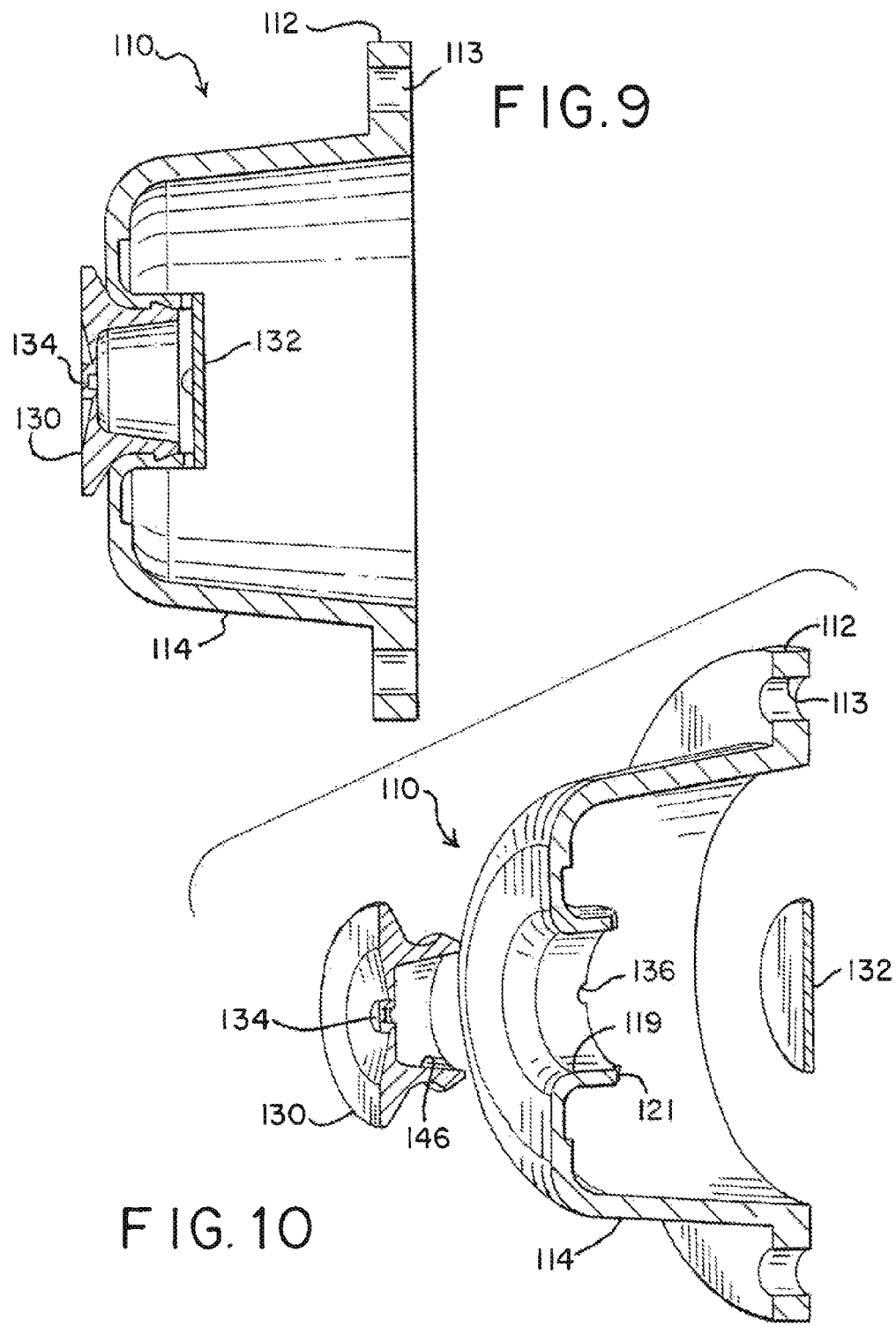

VEHICLE WHEEL HUBCAP WITH VENT

BACKGROUND OF THE INVENTION

A heavy duty truck wheel hub rotates on bearings as part of a wheel hub assembly. A non-rotating spindle supports the wheel hub and bearing arrangement. A hub cap assembly covers and seals an open end of the wheel hub assembly. The function of the hubcap assembly is to contain a lubricant within the wheel hub assembly, to prevent contaminants from entering the wheel hub assembly, and to allow for ready checking of the lubricant, which is typically an oil or a low viscosity grease, and to allow addition of the lubricant. The hubcap assembly is typically bolted onto the wheel hub assembly. Further, the hub cap assembly includes a centrally located opening to receive a plug assembly.

It is an object of the present invention to provide an improved hub cap assembly with an improved plug assembly to lessen the potential of lubricant leaks out of the hub cap and to allow for proper dispersion of the lubricant within the hubcap and wheel hub assembly.

SUMMARY OF THE INVENTION

An improved hub cap assembly is provided which is comprised of a hubcap body having a side portion, a mounting flange portion and an end portion. The side portion is usually of a tapered generally conical or cylindrical shape. The mounting flange portion has a plurality of bolt receiving openings extending axially there through to receive bolts to allow the hubcap to be mounted to the wheel hub assembly. The end portion of the hubcap assembly includes an opening to receive a plug assembly. The plug assembly comprises a main section and a baffle. The main section usually includes a chamber facing axially inward, with an internal radial edge of the main section forming the chamber. The main section of the plug assembly further comprises a pressure equalization opening. The plug assembly baffle usually includes cap section and a retention section, wherein the retention section has a flange received in the plug assembly main section radial groove. Further, the plug assembly main section is received in the main hubcap section opening.

BRIEF DESCRIPTION OF THE DRAWINGS

In the drawings,

FIG. 4 is a perspective exploded view of a hubcap assembly in accordance with a first embodiment of the present invention;

FIG. 5 is a cut away detailed perspective view of a hubcap plug assembly in accordance with a first embodiment of the present invention;

FIG. 6 is a cut away detailed view of a hubcap plug assembly in accordance with a first embodiment of the present invention;

FIG. 7 is a cut away perspective exploded view of a hub cap plug assembly in accordance with a first embodiment of the present invention;

FIG. 8 is a cut away exploded detail view of a hub cap plug assembly in accordance with a first embodiment of the present invention;

FIG. 9 is a cut away side view of a hub cap assembly in accordance with a second embodiment of the present invention, and FIG. 10 is a cut away perspective view of a hub cap assembly in accordance with a second embodiment of the present invention.

DETAILED DESCRIPTION

Figure 1:
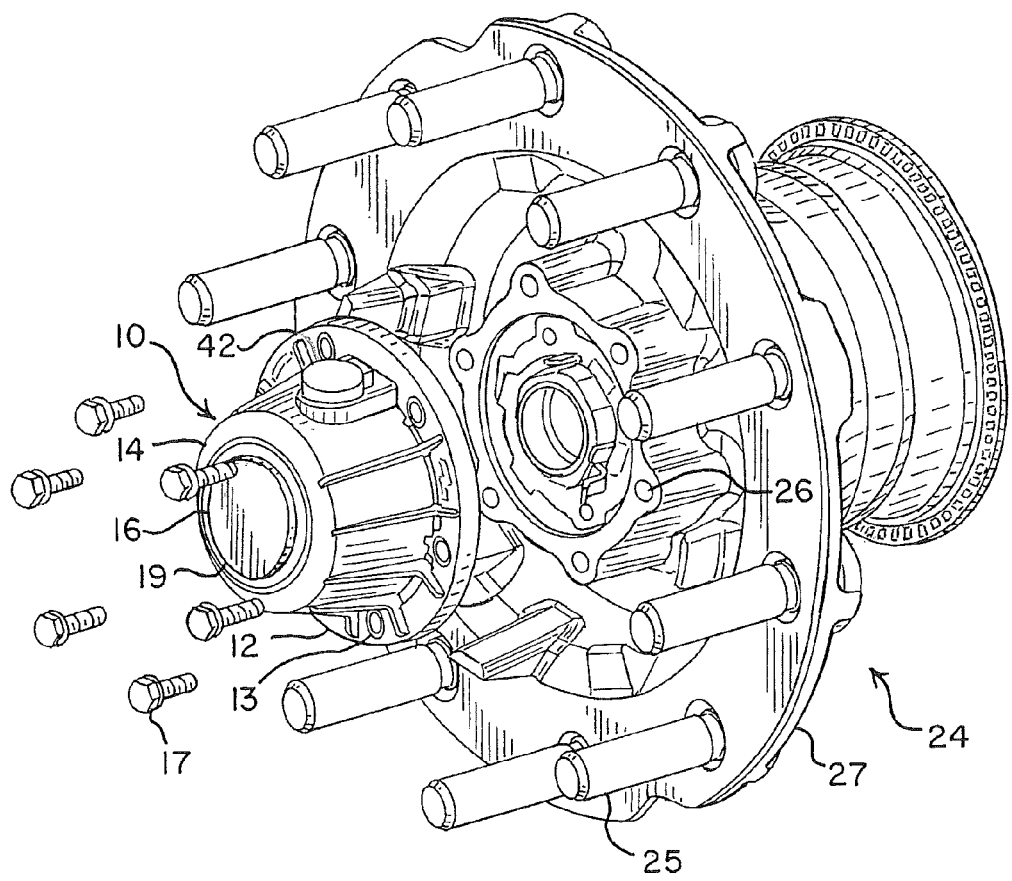
FIG. 1 is a perspective view of a hubcap assembly in accordance with a first embodiment of the present invention.
Figure 2:
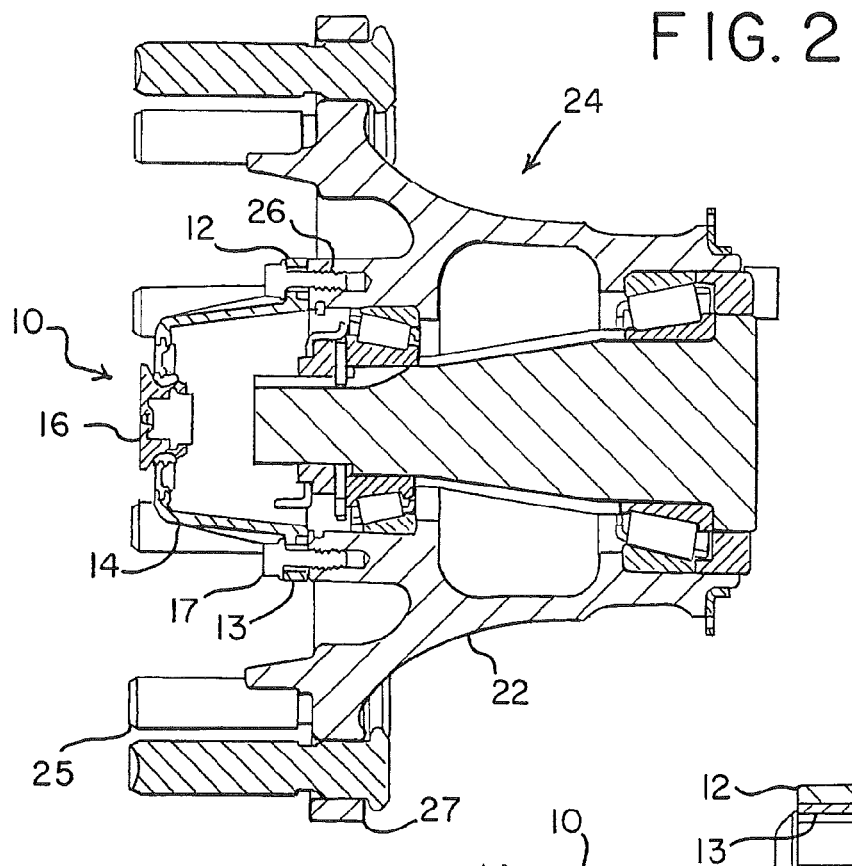
FIG. 2 is a cut away side view of a hubcap assembly in accordance with a first embodiment of the present invention.

Referring now to FIGS. 1 and 2 of the drawings, a hubcap assembly 10 is shown connected to a wheel hub assembly 24. Wheel hub assembly 24 is seen to comprise a generally conical wheel hub body 22 with a generally circular wheel hub flange 27 extending therefrom. Wheel hub bolts 25 are seen to extend axially from wheel hub flange 27. Wheel hub body 22 is typically comprised of cast aluminum or iron, and also includes wheel hub cap bolt holes 26.

Hub cap assembly 10 is seen to comprise hub cap body 14, which is seen to be a generally tapered conical structure or cylindrical structure usually comprised of structural plastic or aluminum, from which hub cap mounting flange 12 extends radially from an inner end of hub cap body 14. Hub cap mounting flange 12 is also seen to include a plurality of hub cap mounting flange bolt holes 13, which are adapted to receive hub cap mounting bolt 17 which extend through hub cap mounting bolt holes 13 into a threaded receipt in wheel hub cap bolt holes 26, thereby securing hub cap assembly 10 to wheel hub assembly 24.

Hub cap assembly 10 is also seen to include hub cap plug assembly 16 which is received in hub cap body opening 19. Hub cap body opening 19 is seen to be formed by a circular edge at the outer axial end of hub cap body 14. Hub cap body 14 is also seen to include a orifice thereon to receive a hub cap body access plug 42. Hub cap body access plug 42 makes the checking and addition of an oil lubricant or a less viscous grease into the inside of hub cap assembly 10 to accordingly provide lubrication for bearings inside wheel hub assembly 24.

Figure 3:
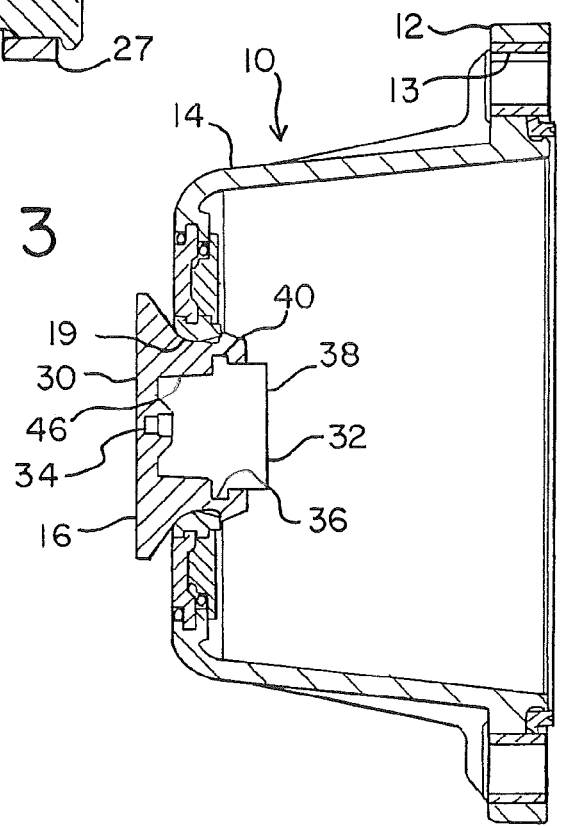
FIG. 3 is a cut away side view in detail of a hubcap assembly in accordance with a first embodiment of the present inventions.

Referring now to FIGS. 3 and 4, a detailed view of hub cap assembly 10 is shown. Hub cap plug assembly 16 is seen to be comprised of hub cap plug main section 30 and hub cap plug baffle 32. Hub cap plug main section 30 is usually comprised of an elastomeric or rubber like material, and is usually conical in shape having a smaller radius end inserted in hub cap body opening 19. Further, hub cap plug main section 30 includes an opening 34 which most typically is in the form of a slit or other controlled or machined opening to allow the equalization of air pressure between the interior of hub cap body 14 and the atmosphere to which the outside of hub cap body 14 and hub cap plug main section 30 is exposed. Hub cap plug main section 30 is also seen to include a chamber 46, better shown in FIGS. 5, 6, 7 and 8. Hub cap plug baffle 32 is seen to comprise a cap section 38 and a retention section or sections 40 extending therefrom. Most typically hub cap plug baffle 38 is comprised of a structural plastic. Hub cap plug baffle retention section 40, is best seen in FIG. 5, are seen to be a plurality of legs extending transversely to hub cap plug baffle cap section 38. Hub cap plug baffle retention sections 40 are seen to include hub cap plug baffle retention section flange 44 which is received in a hub cap plug main section groove 36. Hub cap plug main section groove 36 is seen to be an axial groove toward the radially inner end of hub cap plug main section chamber 46.

Further, when hub cap plug baffle 32 is inserted in hub cap plug main section 30, a plurality of orifices 47 are formed adjacent each hub cap plug baffle retention section 40. Such orifices attenuate lubricant flow toward opening 34 in hub cap plug main section 30. Further hub cap plug main section chamber 46 is seen to include a hub cap plug main section chamber opening wall 48 which is present in the axially outer side of hub cap plug main section chamber 46 and is thus adjacent to hub cap plug main section opening 34.

Referring now to FIGS. 6, 7, and 8, detailed views of hub cap plug main section 30 and hub cap plug baffle 32 are shown. Of particular interest is the formation of hub cap plug assembly orifices 47 when hub cap plug baffle 32 is inserted such that in hub cap plug main section 30. Further note that when hub cap plug baffle 32 is inserted in hub cap plug main section 30, hub cap plug baffle retention section flanges 44 are received in hub cap plug main section groove 36. Hub cap plug baffle is also seen to comprise a hub cap plug baffle cap section 38, which is seen to be a generally flat generally circular structure from which hub cap plug baffle retention sections 40 extend transversely from.

Referring now to FIGS. 9 and 10 of the drawings, a hub cap assembly 110 in accordance with a second embodiment of the present invention is shown. Hub cap assembly 110 is seen to comprise hub cap body 114, which is typically a tapered conical or cylindrical structure, usually comprised of a structural plastic or a metal such as aluminum. Hub cap body 114 includes hub cap mounting flange 112 extending axially from a radially inner end of hub cap body 114. Hub cap mounting flange 112 is also seen to comprise hub cap mounting flange bolt holes 113 to allow hub cap body 114 to be attached by bolts to a wheel hub assembly, which is not shown in FIG. 9 or 10.

Hub cap body 114 is also seen to comprise a generally circular opening 119 at the axially outer end of hub cap body 114. Hub cap body opening 119 is seen to be formed by a structure extending axially inward and ending with hub cap body opening axially inner edge 121.

Hub cap plug main section 130 is seen to be inserted into hub cap body opening 119. Hub cap plug main section 130 is also seen to comprise a centrally located hub cap plug opening 134. Hub cap plug opening is generally formed by a slitting or other operation to allow an equalization of atmosphere inside sealed hub cap body 114 and the atmosphere which is outside of hub cap body 114 and hence also outside hub cap plug main section 130. Hub cap body main section 130 is also seen to comprise a hub cap plug main section 146 which faces axially inwardly in hub cap assembly 110.

Hub cap plug baffle 132 is seen to comprise a generally circular, flat structure, usually comprised of structural plastic. Hub cap plug baffle 132 is affixed to hub cap body opening axially inner edge 121 by any usual means such as gluing or other suitable affixation. Hub cap body 114 is also seen to comprise hub cap body orifices 136 of which a one or more are present along hub cap body opening axially inner edge 121. Such hub cap body orifices 136 allow the equalization of air pressure between the inner sealed area within hub cap body 114 and the exterior atmosphere outside hub cap body 114. Further, hub cap body orifices 136 attenuate the potential for lubricant within hub cap body 114 to exit through such orifices and outwardly through hub cap plug opening 134.

What is claimed is:

1. A hubcap assembly comprising:
   a hubcap body having a side portion,
   a mounting flange portion and an end portion,
   the side portion having a tapered generally conical or cylindrical shape,
   the mounting flange portion having a plurality of bolt receiving openings extending axially there through,
   the hubcap body end portion having a radially inward facing circular edge forming an opening,
   and a plug assembly comprising a plug main section and a plug baffle,
   the plug main section including an inward facing plug chamber,
   with a radial edge of the plug main section forming an outer radial edge of the plug chamber,
   and wherein the plug main section further comprises a pressure equalization opening,
   and wherein the plug main section has an internal edge including a radial groove,
   and the plug baffle of a generally flat shape,
   and wherein the plug baffle is affixed to the outer radial edge of the plug main section,
   and wherein the plug baffle includes a cap section and a retention section,
   and the plug baffle retention section includes a plurality of securing structures extending from the plug baffle cap section, and wherein the plug baffle retention section securing structures form a plurality of orifices when the plug baffle is installed in the plug main section.

2. The hubcap assembly of claim 1 wherein the plug main section comprises a rubber material.

3. The hubcap assembly of claim 1 wherein the pressure equalization opening in the plug main section comprises a slit that allows air to pass through.

* * * * *